Sept. 26, 1961 W. H. RANDALL ET AL 3,001,581
PULP MOLDING APPARATUS
Original Filed Oct. 15, 1951 8 Sheets-Sheet 8

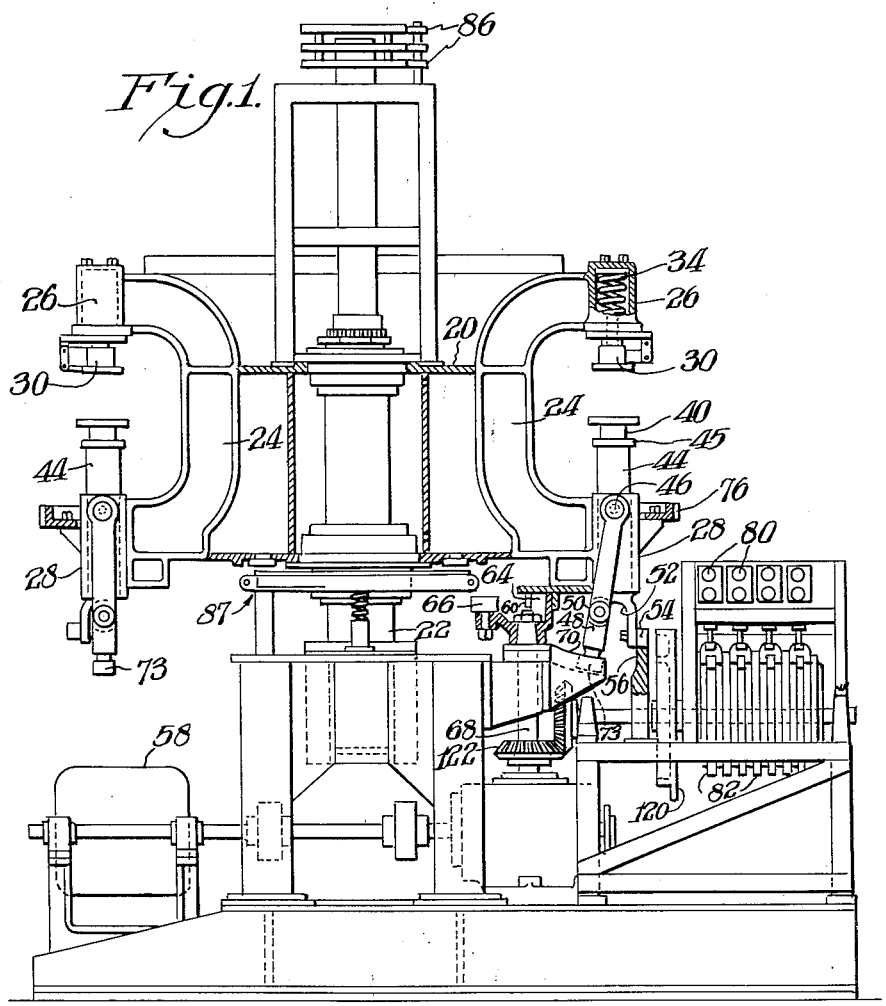

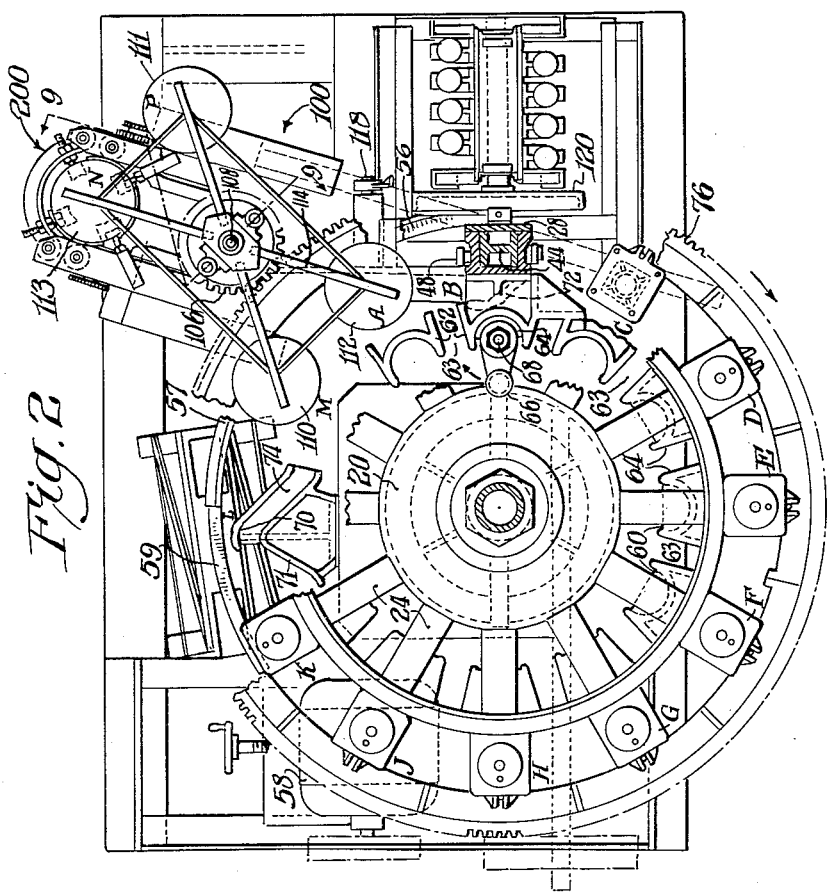

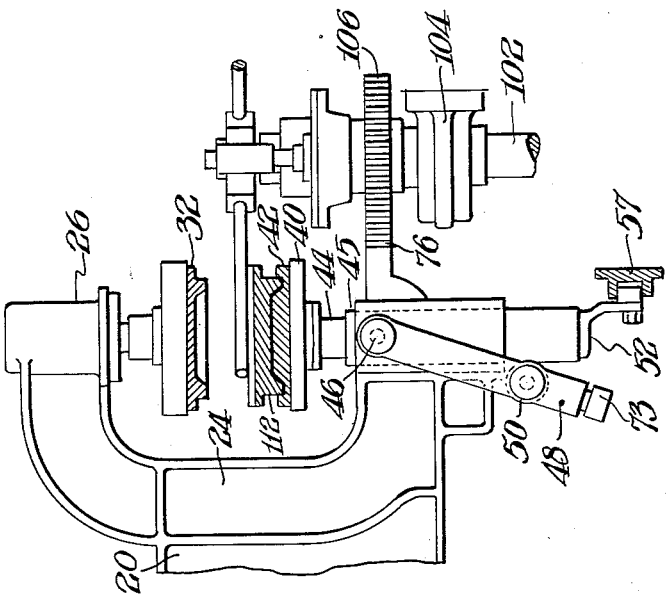
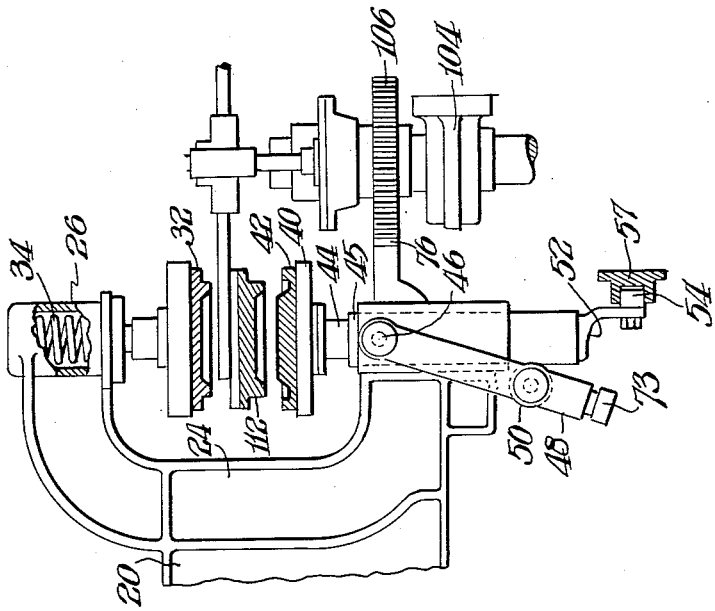

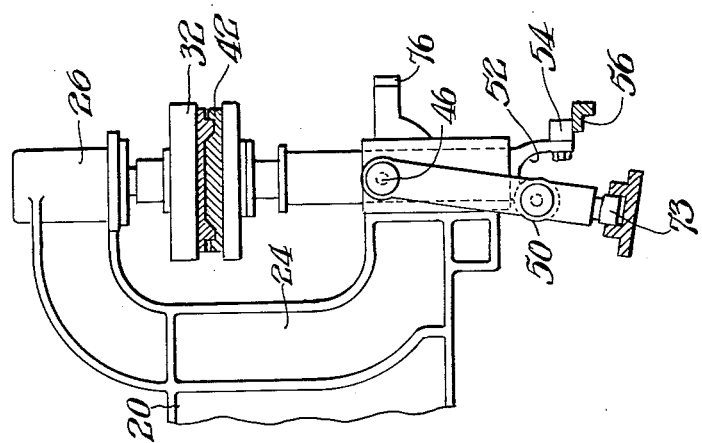
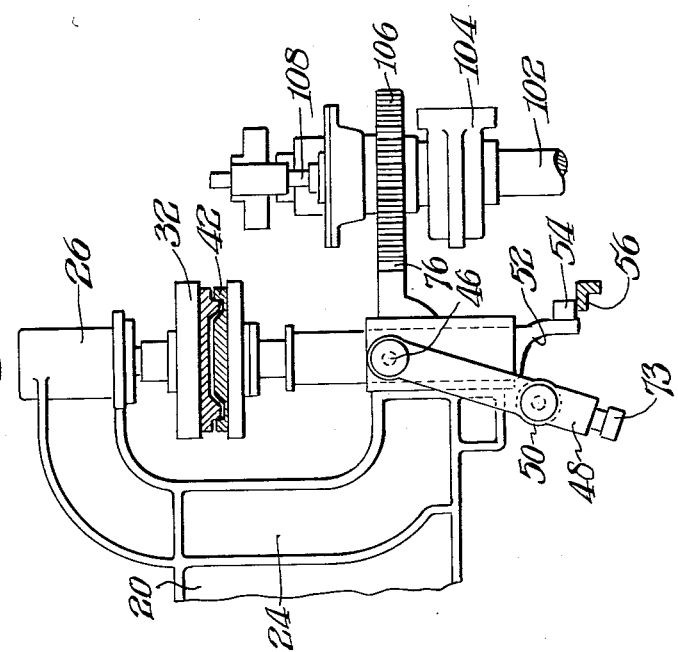
INVENTORS:
WALTER H. RANDALL
& RICHARD L. EMERY
BY
Connolly and Hutz
ATTORNEYS

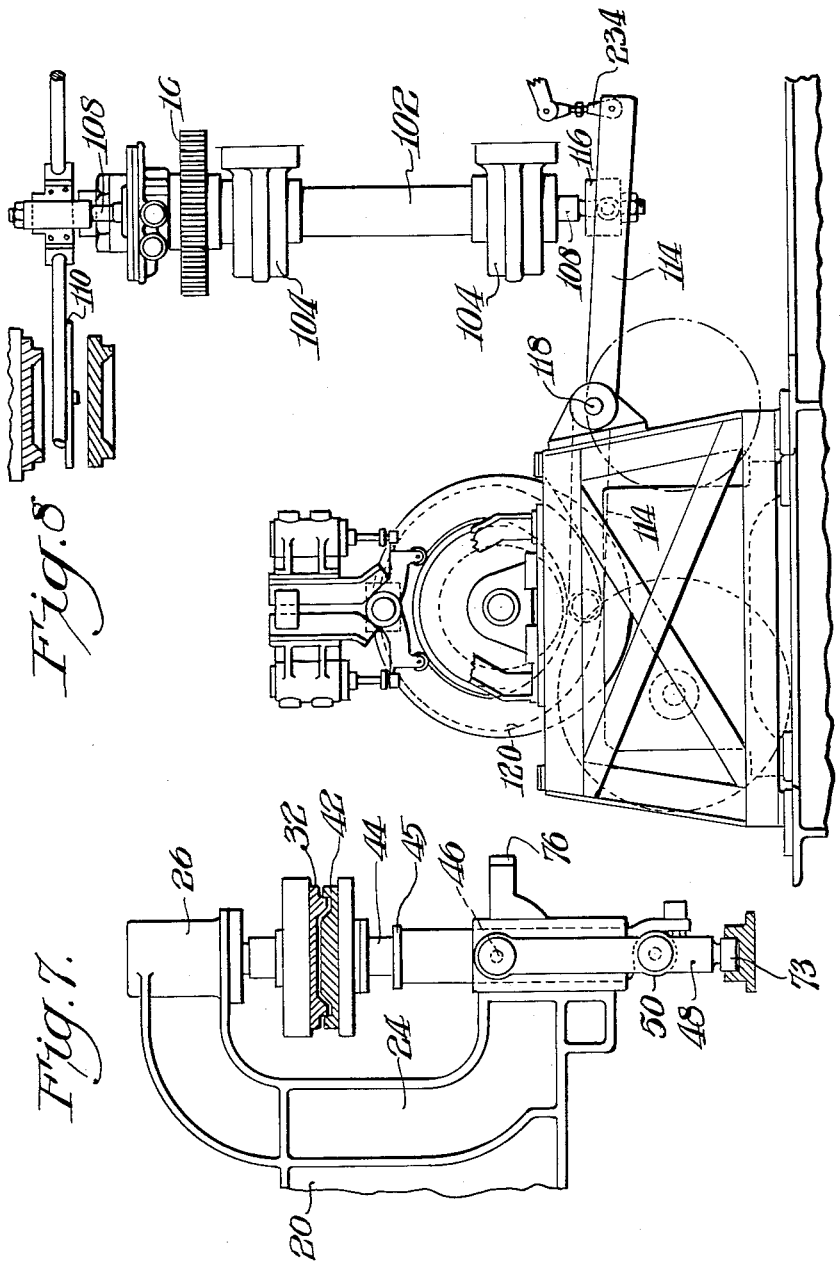

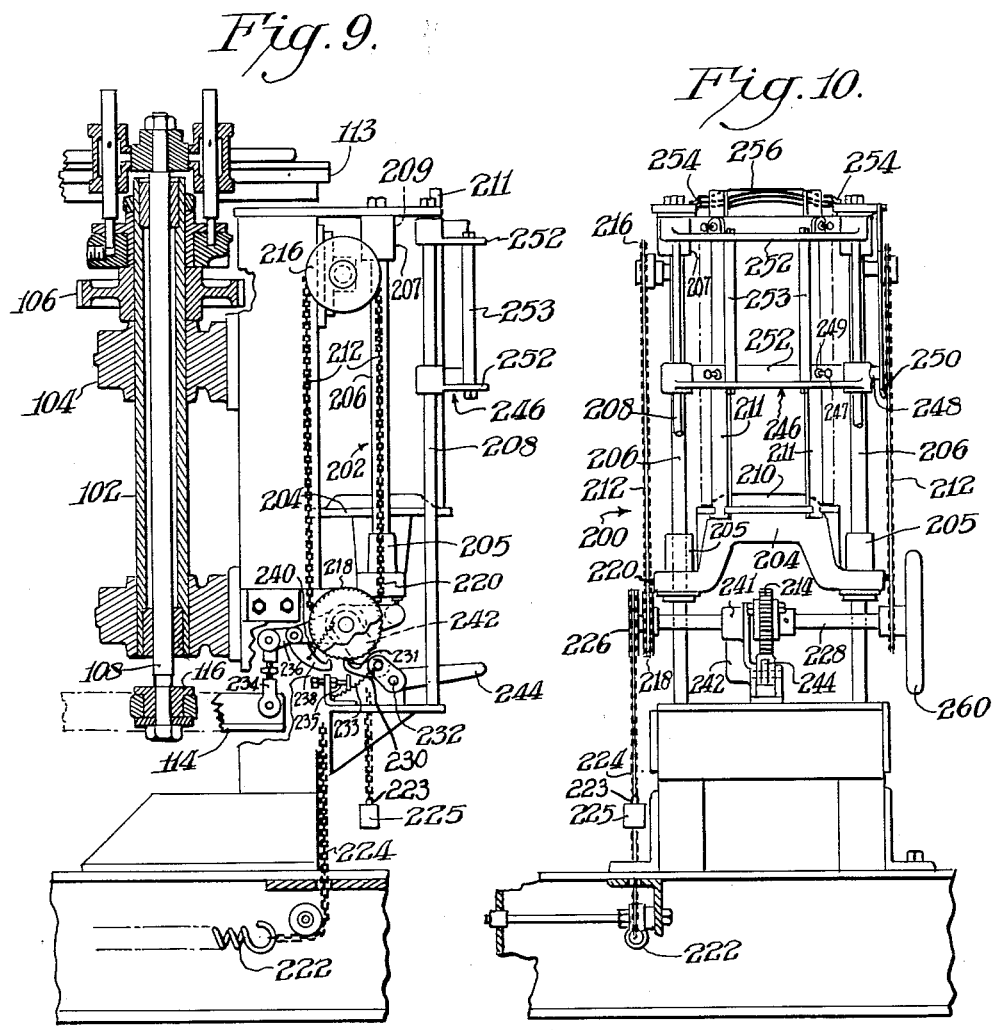

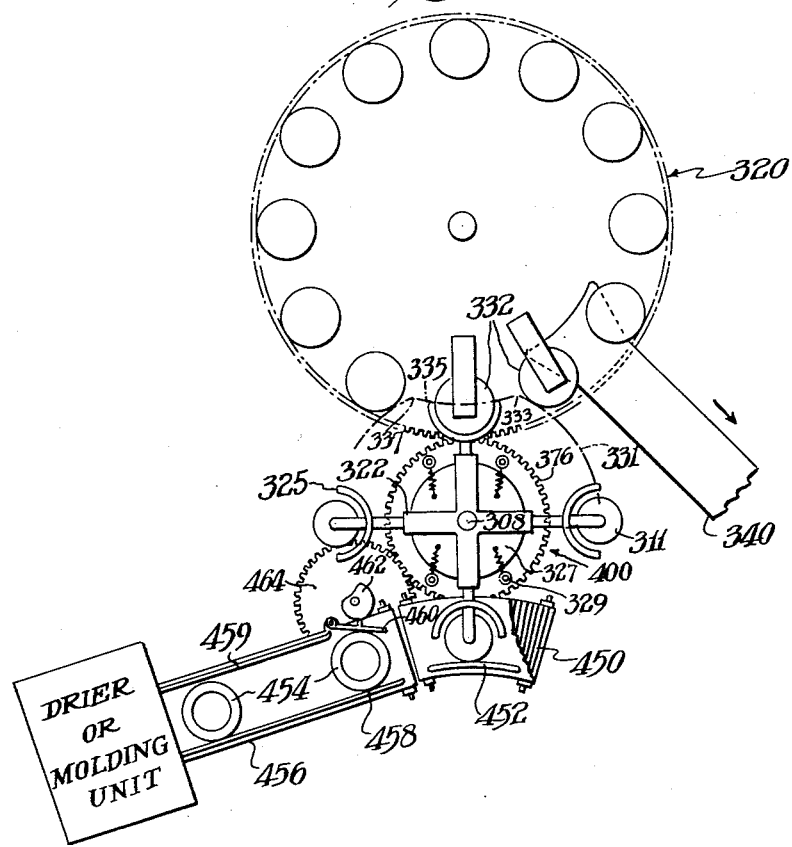

INVENTORS:
WALTER H. RANDALL
BY & RICHARD L. EMERY
Connolly and Hutz
ATTORNEYS

United States Patent Office 3,001,581
Patented Sept. 26, 1961

3,001,581
PULP MOLDING APPARATUS
Walter H. Randall and Richard L. Emery, Waterville, Maine, assignors to Keyes Fibre Company, Portland, Maine, a corporation of Maine
Original application Oct. 15, 1951, Ser. No. 251,411, now Patent No. 2,752,830, dated July 3, 1956. Divided and this application Oct. 7, 1955, Ser. No. 539,096
16 Claims. (Cl. 162—377)

This invention relates to the pressing and finishing of molded pulp articles after they have been formed to substantially the desired shape.

When molded pulp articles are formed they contain a relatively large amount of water which must be removed. In the past this water has been removed by subjecting the wet articles to several types of drying operations. In one of these, the freshly molded wet article is pressed between heated dies corresponding in shape to those with which the articles are formed. This calls for the use of a relatively large number of expensive dies. Many types of articles, and particularly those whose dimensions or shapes are not critical, can be dried without the use of accurately shaped heating dies, as for example by merely passing them in freely supported condition on a conveyor belt through a steam heated drying tunnel. This so called free-drying technique is much less expensive than drying them between carefully machined heated dies. However, free drying results in at least a small amount of warpage, and the final article has a somewhat fluffy and rough surface appearance. Such an article is often unacceptable to the trade because of the crude appearance and shape. This is particularly true if such an article is to be sold or used on the basis of its better appearance.

Among the objects of the present invention is the provision of improved drying or finishing apparatus and methods for the treatment of molded pulp articles to give them the dimensional accuracy and/or degree of surface finish that is desired.

Additional objects of the present invention include the provision of a novel form of drying or finishing apparatus which does not have to have its major components go through the undesirable inertia effects of repeated stop and start steps to treat molded articles whether or not they have previously been dried, and which is simpler and more rugged than prior art machines of this type.

The above, as well as further objects of the invention, will be more readily understood from the following description of several of its exemplifications, reference being made to the accompanying drawings wherein:

FIG. 1 is an elevation, with parts in section, of a drying and finishing apparatus embodying the present invention;

FIG. 2 is a plan view, with parts in section, of the apparatus of FIG. 1;

Figure 12:
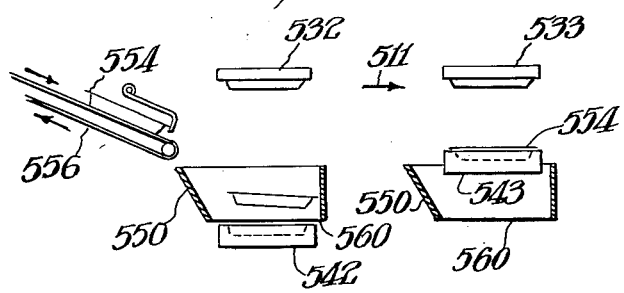
Figure 13:
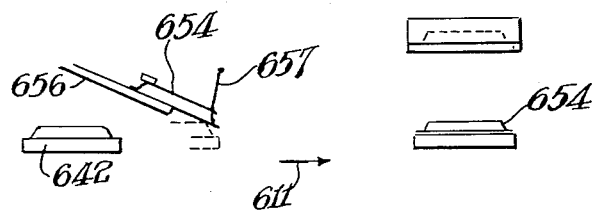

FIGS. 3 to 7, inclusive, are detail views illustrating a sequence of operational steps involved in the operation of the apparatus of FIGS. 1 and 2;

FIG. 8 is an elevational view showing the transfer mechanism portion of the apparatus of FIGS. 1 and 2;

FIG. 9 is an elevational view partly in section along the line 9—9 in FIG. 2 of the transfer mechanism of FIG. 8;

FIG. 10 is an elevational view of the feed assembly portions of the transfer mechanism of FIGS. 8 and 9;

FIG. 11 is a schematic showing of a modified construction exemplifying the present invention; and FIGS. 12 and 13 are diagrammatic side views of further types of apparatus exemplifying the invention.

According to a preferred embodiment of the present invention, wet molded articles are partially free-dried, and while they still contain an appreciable moisture content, are subjected to a drying and finishing operation between a set of complemental heated pressing dies. A suitable pressing apparatus for this purpose includes a series of mating pairs of complemental dies, one or both of which may be heated, the series being disposed in an endless or circular path, driving structure is connected to move the series around this path so that all the individual pairs of mating dies move successively through a predetermined position, operating mechanism is provided to move one of the dies of each pair away from and into face-to-face relation with respect to the other in a fixed transfer zone of the travel path, the other die of each pair being non-retractably, or substantially non-retractably mounted, said operating mechanism including loading elements interconnected for delivering an article to be dried and finished to one of the dies of each pair while these dies are held apart after which the dies are brought into face-to-face relation, pressing means is connected to press the dies of each pair together as they leave the transfer zone and to hold them together under heat and pressure through a pressing zone that occupies substantially the remainder of the travel path, said operating mechanism also including unloading structure connected for receiving a finished article from the open dies in the transfer zone to remove this article from the apparatus and make way for the next article to be finished. For maximum efficiency the transfer zone should extend over a minimum amount of the travel path along with the dies progress.

The individual sets of dies can be arranged either to move around the travel path in short steps or continuously without stopping except when the equipment is shut down. The molded pulp articles fed to the machine can have a moisture content varying from about 10% to about 75% or more based on the total wet weight. After finishing in the above apparatus the moisture content is generally between about 5% and 8%. Where it is desired to obtain a particularly smooth and even glossy finish on the molded article, the moisture content should preferably be at least about 25% when it enters the machine. The lower initial moisture contents are very effectively used when the articles are to given a lighter finishing treatment, as for example to iron out any warpage and restore the article to substantially its original molded shape with a minimum improvement of its surface appearance. Below 10% moisture, however, it becomes commercially impractical to effect much ironing or surface improvement without destroying many of the physical characteristics desired in the finished article.

The drying and finishing apparatus of FIGS. 1 to 10, inclusive, has a main table or framework 20 which is journalled on a vertical shaft 22 and carries a set of radially disposed die holders 24. Each die holder is generally C shaped and includes an upper socket 26 and a lower guide 28 of tubular form vertically aligned with each other. The upper sockets 26 resiliently hold individual die carriers 30 to which upper dies 32 (FIG. 3) are securely fastened. In the form shown the resilient mounting is provided by coil springs 34 seated against the blind upper end of socket 26 and holding carrier 30 somewhat below the highest or fully seated position. The resilience not only acts as a control of the die clamping force but provides a margin of safety should two or more articles become accidentally loaded on a single die at the same time.

Vertically slidable in the lower guides 28 are elongated shanks 44 to which are fastened lower die carriers 40 carrying lower dies 42 (FIG. 3). The outer portions of each C-shaped holder 24 also carries, as by means of oppositely projecting horizontal pins 46, an opposed pair of pivoted compression links 48. Suitably disposed between each pair of links is a wedging roller 50 journaled about a horizontal axis and engageable with a cut-away wedge surface 52 at the lower portion of shank 44. The shanks also carry independent lifting rollers 54 which rest upon and cooperate with radially disposed fixed cam segments 56, 57 positioned for automatically raising and lowering the lifting rollers, respectively, at the proper times. A collar 45 on shank 44 acts as a lower limit stop for the opening movement of the lower dies.

In the above construction the framework 20 is rotated by means of electric motor 58 and an internal Geneva movement including a plurality of circular locking sectors 60 and bars 62 defining radial driving slots 63 fixed to the cage, along with a rotatable Geneva driver having a cooperating annular locking segment 64 concentric with segments 60, and driving roller 66 driven by shaft 68. The rotating drive is arranged so that there is one stepping position or circular sector 60 for each die holder 24 and with each revolution of shaft 68, the framework is stepped a distance which brings each holder 24 to the position previously occupied by an adjacent holder. In other words, the stepwise rotation carries each die holder through the same fixed and predetermined stopping positions between steps. For actuating the compression links 48, fixed cam operators 70, 72 are suitably supported to engage with a cam-following roller 73 fastened on each pair of the links. Cam 70 (FIG. 2) is positioned at the end of a pressing zone and has an inwardly off-set portion 74 to effect unlocking of the pressing dies, while cam 72 is located at the beginning of the pressing zone and causes the dies to be locked in pressed engagement.

In the shorter or transfer zone between the cam operators, 70, 72, the dies carried by the holders are arranged to be opened, unloaded, and have fresh articles supplied, for drying and finishing through the balance of the table rotation. To effect these transfers, a transfer unit 100, shown more clearly in FIGS. 8, 9, 10, is mounted alongside the framework 20 in the transfer zone. Unit 100 includes a hollow shaft 102 journaled in fixed bearings 104 and carrying a drive gear 106 meshing with a peripheral ring gear 76 provided on framework 20. Vertically slidable within hollow shaft 102 and also rotatable along with this shaft, as by splined interconnection, is a post 108 which carries a pair of oppositely directed unloading dies 110, 111 and another pair of oppositely directed loading dies 112, 113 (FIG. 2). The lower end of post 108 is supported by a rocker lever 114 having a post-engaging block 116 and pivoted at 118 for actuation by a cam wheel 120. This cam wheel in turn is rotated by means of bevel gears 122 (FIG. 1) so as to be synchronized with the rotation of the main frame 20.

Below the outwardly projecting loading die 113 at position N (FIG. 2) there is positioned a upply unit 200 for feeding individual molded articles to be pressed. A vertically disposed rack 202 is fixed in place and slidably holds a vertically movable feed platform 204 which is shown as having bosses 205 slidably guided on posts 206 forming part of the rack. At their tops, the posts 206 can be provided with sockets 207 for snugly receiving the bosses 205 and acting as a pneumatic stop to prevent jarring when the platform is permitted to move up in an uncontrolled manner. Bleed orifices 209 can also be provided to allow the platform its full range of upward travel. In the form shown the apparatus is designed to dry and/or finish molded pulp plates or dishes, and platform 204 is correspondingly shaped to receive a stack of these plates. The lowest plate in the stack is shown at 210 in FIG. 10, and a set of supports 211, of which two are shown, keeps the stacked plates aligned and prevents them from toppling. For convenience in loading, a portion of the vertically disposed stack guides may be removably held in place as shown for example by the panel 246 which is slidably held on rack posts 208 and can be latched in its upper or closed position as by interaction of latch pin 248 with a suitably cut out latch spring 250. Yokes 252 forming the top and bottom of this panel and connected by bars 253 provide convenient manipulating structure by which the panel can be grasped and lowered to the open position or moved to the closed position illustrated. Some or all of the supports 211 can advantageously be carried by the panel 246, preferably in adjustable positions as by bolts 247, held by jam nuts 249, so as to accommodate articles of various widths. A hand wheel 260 fastened to shafts 228 enables the lowering of platform 204 when desired.

The platform 204 is linked by means of a pair of chains 212 with a feed ratchet gear 214 fixed on rotatable shaft 228 and this gear is connected for stepwise advancement by rocker lever 114. Chains 212, one on each side of the platform, may conveniently be of the endless type looped around freely journalled upper sprockets 216, around lower sprockets 218 fixed to shaft 228, and secured as indicated at 220 to suitable portions of the platform. A spring 222 acting through an additional chain 224 and another sprocket 226 fixed to a common shaft 228 along with sprockets 218 and ratchet gear 214, cooperates to urge the loading platform upward. The end 223 of chain 224 can hang free, or be held down as by weight 225.

A ratchet advancing pawl 238 is carried by an arm 236 pivoted to shaft 228 and connected for reciprocation by a linkage 234 with rocker lever 114. For adjustment purposes, the linkage can be a turnbuckle, as illustrated. The pawl 238 and ratchet gear 214 have inclined teeth pointed in opposite directions so that when they are engaged the ratchet gear cannot be rotated in counterclockwise direction as seen in FIG. 9, and the platform accordingly cannot be raised. Although the pawl is shown as disengaged, this is only in the interest of clarity since it is normally engaged under the influence of bias spring 240.

A release cam 230 is pivotally held on shaft 228 by bar 242 integral with boss 241. The inner surface of the cam 230 is positioned to clear the teeth of ratchet gear 214, but the cam has a nose 231 which is located in the path of pawl 238 and acts to cause the downwardly moving pawl to lift itself up along the nose until the pawl becomes disengaged from the ratchet gear. An adjustable stop bolt 235 and bias spring 233 cooperate with the cam bar 242 to fix its position. A control lever 244 pivoted at 232 is also provided to manually withdraw and interrupt the operation of the release cam 230 when desired. In addition this lever 244 can be placed in the path of panel 246 to automatically stop the feed when the panel is opened, as for loading.

To assist the transfer dies 112, 113 in picking up the uppermost plates of the loading stack away from the plate below it, a separating device is advantageously used. In FIG. 10 the separating device is in the form of constricting structure at the upper end of the stacking passageway, provided by fingers 254 projecting in against the sides of the stack. The fingers 254 leave between them a plate passageway slightly smaller than a plate diameter, and are located just below the lowest position of the transfer die 112 so that only one plate can lie above them. The next lower plate will be pushed up by platform 204 against the fingers which cause it to become bowed as indicated at 256 keeping it from nesting engagement with the uppermost plate and greatly simplifying the removal of the uppermost plate.

For simplifying the transfer of the articles being treated from one die to another, the dies may be perforated and fitted with suction and/or compressed air supplies. Control units 80 (FIG. 1) operated as by cams 82 driven in synchronism with the transfer unit 100 provide the desired timing of these transfer assisting features. Connections such as slip rings 86 are provided to conduct heating current to the pressing dies 32, 42 on the main frame 20. In addition a rotary valve assembly 87 can be arranged to establish vacuum and/or compressed air connections to these dies for operation at desired portions of the rotation cycle.

In operation the motor 58 rotates the main frame 20 clockwise as seen from above (FIG. 2) through arcuate steps equal to the separation between adjacent pairs of dies. The transfer-die-holding shaft 108 is rotated counterclockwise a half turn (180°) per step. The articles to be dried and/or finished are placed on the loading platform which is lifted up to bring the top of the stack against the fingers 254, or to that height if the fingers are not used. To lower the platform for loading purposes, the handwheel 260 is rotated clockwise, looking in the direction of FIG. 9. This rotates ratchet gear 214 past the pawl 238 which is lifted out of the way by the inclined teeth.

Referring more particularly to FIG. 2, as the frame 20 rotates, a pair of pressing dies is moved into position A while the loading transfer dies 112, 113 are rotated around to interchanged position and vertically reciprocated. At position A after the completion of the advancing step, the parts are then in the relationship shown in FIG. 3.

During the vertical reciprocation one loading die 113 is brought against the top of the stacked plates while the pawl 238 is momentarily disengaged by cam 230 out of ratchet-holding engagement. The holding platform 204 accordingly moves upwardly as far as it can go under the influence of spring 222, or up against the loading die above the stack. At the same time suction applied to this loading die causes the uppermost plate to be sucked onto the die and there held in place.

While this loading is taking place, the opposite loading die 112 is brought down against the open pressing die 42 just below it, as shown in FIG. 4 and deposits a previously loaded plate on this die. Suction can now be cut off from the loading die, applied to the pressing die and/or a puff of compressed air used to help this deposition.

The final lifting of the loading dies at the completion of the vertical oscillation returns the loading die 112 to the position shown at FIG. 3. This is accompanied by shifting of the pawl 238 in the clockwise direction so that the ratchet gear 214 is engaged and rotated to carry the platform 204 back down somewhat from its most elevated position. This lowers the stack somewhat and compensates for its springiness which otherwise might force the upper plates over the top when the downward pressure of the transfer die is removed.

The teeth of ratchet gear 214 need not correspond in pitch to the turning required to move the stack the thickness of a plate since this downward motion will always carry the stack sufficiently far away from the transfer die after the topmost article is picked up by the die. If desired, however, a finer adjustment can be provided as by using two or more pawls 238 side by side with their teeth staggered so that the latching engagement alternates from one to another and moves through steps smaller than the spacing of the individual teeth on any one pawl.

The next step in the rotation of frame 20 carries the open pressing dies with the transferred plate from position A to position B. Cam segment 56 here lifts the lower die 42 with its plate up against the upper die 32 as shown in FIG. 5. At the same time or shortly thereafter cam 72 carries the pressing link 48 outwardly to the positions shown consecutively in FIGS. 5, 6, and 7. At the position of FIG. 6 the wedging roller 50 is brought into engagement with the wedge surface 52 and the upper die 32 has not yet been forcefully engaged so that it may still be suspended by its resilient mounting.

Continued movement of link 48 to the position of FIG. 7 causes the lower die to be wedged upwardly by roller 50, compressing the resilient support for the upper die and applying the desired pressing to the loaded plate.

At about this time heat may be applied to the dies, as by closing an electric circuit to electric heaters in both dies 32, 42. Alternatively the heating can be maintained uninterruptedly throughout the rotation of the main frame. From position B the closed dies are kept locked by the pressing links and are then stepped through positions C, D, E, F, G, H, J, K without interrupting the pressing. The locking of the compressing links can be secured by providing these links 48 with an over-center holding arrangement as by suitably shaping the wedging surface 52 in the manner shown in the figures.

Upon the movement of the dies through the steps L and M the links 48 are first unlocked by cam operator 70 and the lower die permitted to drop by the suitably shaped upper surface of cam segment 57. The dies accordingly open by retracing the sequence through the positions shown at FIGS. 7, 6, 5 and 3. However, at position M the open pressing dies have between them one of the unloading dies 110 instead of the loading die 112 shown in FIG. 3.

When the dies reach position M, or as they are about to move from there to position A, the vertical reciprocation of the transfer shaft 108 carries the unloading die 110 against the lower die 42 just beneath it as in FIG. 4, and with or without the assistance of suitably directed suction and/or compressed air, the plate that has been through the pressing cycle is transferred to this unloading die. Upon rotation of the transfer shaft 108 this unloading die is moved to position P (FIG. 2) where it then blows or permits the unloaded plate to drop onto a suitable discharge receptacle or conveyor, not shown.

This unloading sequence of the transfer mechanism, as described above, can be effected at the same time as the loading. In other words, each step of the transfer unit corresponding to a step of the main frame 20 can include a single vertical reciprocating step which simultaneously does the following operations:

(a) Transfers to unloading die at position M a plate that is carried by the pressing dies at this position.

(b) Transfers to the pressing dies a plate from a loading die at position A, which plate was previously picked up by this loading die at position N.

(c) Discharges from unloading die at position P a plate that it has previously received at position M.

(d) Transfers to a loading die at position N the top plate from the feed supply stack on loading platform 204.

It will thus be seen that the stepping of the pressing dies from position M to position A is accompanied by the unloading of the previously pressed plate and the loading of a fresh plate. From position A the dies then repeat the cycle described above so that the plates are continuously being loaded, pressed and discharged.

The vertical reciprocation can be arranged to take place at any time during the stationary dwell period of the framework 20 between rotational steps. So long as the main framework is substantially stationary when the transfer dies engage the pressing dies, the desired transfers will take place even though the transfer die reciprocation starts or ends while the frame 20 is moving.

Instead of having the framework 20 rotate in discrete steps, its rotation can be made continuous. For this purpose the transfer apparatus is preferably revised so that the transfer dies follow a path which for a short distance exactly coincides with, but is above, the path of the pressing dies 42. This distance should be sufficient to allow transfer by the reciprocating transfer dies. During this coincidence, the vertical reciprocation of the transfer dies is readily arranged without requiring the critical timing that would otherwise be necessary to assure that the lower pressing die is in the appropriate instant or portion of its rotation when the transfer dies reach their lowest or transfer position.

One convenient technique for coinciding the travel of the dies is to have the arms carrying the transfer dies constructed of telescoping sections and suitably guided as by fixed peripheral guides so that during the travel of the transfer dies across position M and position A the arms telescope to carry these transfer dies along an arc of the circle drawn about the rotating center of shaft 22. The path coincidence can be extended over the entire transfer zone or can be limited to one small portion of this zone for loading and another spaced portion for unloading. Where a single transfer turret is used for both loading and unloading, pressing dies reaching only one position, an odd number of pressing die sets should be used to enable proper operation. In such a modification, the pressing dies should be arranged to go through two revolutions per machine pressing cycle. It is advantageous in this type of operation to have an even number of transfer dies, half used for loading and the other half for unloading, these dies alternating around the transfer turret so that the loading dies do not have to do any unloading and vice versa.

Although a single transfer turret is shown below in connection with FIG. 11, separate loading and unloading turrets can also be used, each engaging the main frame at a different portion of the transfer zone.

The transfer dies which can, according to these modifications, also rotate continuously about shaft 108 can be operated with the loading stack on platform 204 by arranging for this platform and its associated structure to oscillate about a circular path having its center at shaft 108. This horizontal oscillation can then readily be synchronized so that the vertical reciprocation of the rotating loading will take place while the platform is in that portion of its oscillation in which its movement corresponds in direction and velocity to that of the transfer dies.

If desired, the rotating transfer dies can have their positioning arms further guided by interrupting mechanism to slow down or stop their rotation for a small portion of their travel, during which time the vertical reciprocation is arranged to take place. When the reciprocation is completed the interrupting mechanism releases the arm which can then be resiliently returned at a higher than average speed to is proper position in the rotation cycle.

According to a modified form of the present invention, unloading of finished articles is effected by means of an unloading chute which can conveniently be positioned in an appropriate portion of transfer zone below the upper pressing die. The individual upper pressing dies can then be arranged to have the pressed articles adhere to them, as by means of suitably applied suction, when the dies are parted. To assure the accurate dropping of the pressed articles into the unloading chute, the holding vacuum can be released and if desired a puff of compressed air automatically added at the appropriately synchronized instant. This type of construction dispenses with the need for unloading dies on the transfer mechanism. The number of dies carried by shaft 108 can then either be reduced, or all of these dies can be operated as equally spaced loading dies that rotate with only one small range of the rotation travel coinciding with the pressing die rotation.

According to a further phase of the invention, the supply of articles to the loading stack 210 for drying and/or finishing can also be arranged to take place in a continuous manner. For this purpose a feeding apparatus of the type shown in copending U. S. patent application, Serial No. 789,167 filed December 2, 1947, is effectively used to continuously supply a suitable spaced row of molded articles directly from the forming and/or preliminary drying unit. An escapement mechanism as shown in that application times the delivery of each article so that one is brought into loading position under a transfer die in time for it to be picked up by the die as it descends.

FIG. 11 illustrates the essential elements of such an apparatus. In this construction an assembly of pressing dies can be arranged as a unit 320 similar to that of framework 20 in the construction of FIG. 1, except that assembly 329 is arranged for continuous (non-intermittent) rotation. The upper die of each pressing pair is shown at 332. A transfer assembly 400 carrying a set of transfer dies 311 is shown as connected by gear 376 with the pressing die assembly so that both assemblies rotate in unison. The individual transfer dies 311 are mounted on telescopic arms 322 and adjacent each transfer die there is provided an aligning fork or shoe 325 shaped to engage the exterior of the successive pressing dies 332. The arms 322, shown as four in number, are equally spaced around the periphery of the transfer unit 400 and are carried by a plate 327 which is resiliently secured to gear 376 as by means of the centering springs 329. The remainder of the transfer unit 400 may be similar to the transfer unit 100 in the construction of FIGS. 1 to 10, with the arms 322 correspondingly arranged to reciprocate along its axis of rotation on shaft 308.

Arms 322 are resiliently held, as by internally fitted springs, in outwardly extending position where the dies 311 move through a circular path defined by the dot-dash lines 331. However, when the successive transfer dies reach position 333, the aligning forks 325 are engaged by the moving pressing dies 332 which force the arms to telescope inwardly so that the transfer dies follow the dash line path indicated at 335. During this portion of their movement the transfer dies are aligned with and move congruently with the pressing dies so that vertical reciprocation will effect the desired transfer of articles to the pressing dies. At position 337 the transfer dies return to their circular path 331 and leave the transfer zone of the pressing assembly 320.

During the motion along path 335 the transfer arms are constrained to travel at an angular velocity which varies from point to point by reason of their continuously changing radii. Resilient holding elements 329 accordingly permit floating plate 327 to rotate with respect to gear 376 so that the transfer dies can accurately follow the pressing dies without disturbing the fixed gear driving connection. When the path 335 is varied with respect to the pitch or meshing line of the drive gears, the transfer turret will also show further changes in angular velocity at the intersection points 333 and 337. The resilient drum mounting arrangement can also accommodate these further changes.

The articles to be pressed and dried are fed to the transfer assembly 400 by means of a conveyor section 450 shown as of the arcuate type having a center of curvature and angular velocity identical with those for the pressing assembly 320. A guide wall 452 is positioned above curved conveyor 450 to coact with the projecting portions of transfer dies 311 to deflect the dies into a path having a curvature coinciding with that of conveyor 450. Articles to be molded as indicated at 454 are supplied to the curved conveyor 450 from a linear conveyor 456. To accurately correlate the feed of these articles with respect to the movement of the transfer dies 311, an escapement mechanism is arranged to suitably time the arrival of successive articles.

In the form shown the escapement mechanism includes a fixed wall 458 and a resilient blade 460 suitably anchored and resiliently held against a cam 462 driven from gear 376 through a meshing gear 464. An additional fixed wall 459 can be placed opposite wall 458 to form between them a channel through which the successive articles 454 will freely pass. Blade 460 is arranged to be moved by cam 462 towards wall 458 to an extent that prevents passage of an article 454. However, during its rotation the cam permits the blade at the correct moment to withdraw from wall 458 and allow an article to be discharged on to the curved conveyor 450, where it is picked up by a transfer die. Should an article held by the escapement mechanism cause closely following articles to pile up behind it, auxiliary wall 459 will keep these piled up articles aligned so that there is a reduced tendency to jam or divert the supplied articles. To further reduce jamming, an overhead guide can also be mounted above the conveyor 456 at a distance slightly more than the height of a single article 454 so that the moving conveyor does not cause an article to slide over or under a previous article held by the escapement.

In operation the apparatus of FIG. 11 can have conveyor 456 fed directly from the dryer or molding unit and conveyor 456 can be the belt conveyor on which the articles are normally discharged from the molding equipment, as shown in Chaplin Patent No. 2,163,585, or the wire belt on which they are carried through a tunnel drier, as described in Randall application, Serial No. 789,167, filed December 2, 1947. The articles will be automatically and continuously picked up by the transfer arms from conveyor 450 in exactly the same manner as they are loaded on to the pressing dies. Both the path 335 and the corresponding path over pick-up conveyor 450 can very effectively extend over no more than the distance required for the moving articles 454 to travel in a time of about one-half second. However, where faster vertical reciprocating transfer cycles can be used, correspondingly shorter paths are suitable. An unloading chute 340 may be provided in the transfer zone to receive the pressed articles ejected from the upper die by a blast of air as it passes over the chute after the completion of a pressing cycle and before the pressing dies reach the loading position.

The pressing dies of the apparatuses of FIGS. 1 and 11 are preferably heated to between about 250° and 450° F. Lower die temperatures can also be used but require longer pressing treatments to effect the desired drying.

The segmental cam constructions shown above in FIG. 2 are advantageously incorporated in the construction of FIG. 11. Such cams are not only simpler to provide, but in addition they permit opening of the transfer dies in the pressing zone. Thus at any but the extreme positions of the pressing zone, the links 48 holding a pair of dies closed can have their lower end manually pushed inwardly, thereby releasing the lower of these dies and permitting them to open. This is a highly desirable operation, particularly when the apparatus is shut down and molded articles carried by the pressing dies are to be kept from over-heating and possible burning. It should be noted that the unlocking cam 70 includes a locking section 71 to assure the proper closing of any dies that have been opened in the pressing zone so that the open dies need not be watched but will be automatically closed without interfering with the operation of this cam. To the same end a corresponding relifting cam 59 immediately precedes the lowering cam 57. As shown more clearly in FIGS. 3 and 4, the lowering cam can be of the positively operating type for assuring that the lower dies stay down during the transfer operation.

Another feature of the segmental cam construction is that the tilting, raising and lowering cams are thereby relieved of most of the forces required to effect the desired pressing. The pressing is effected in the construction of FIG. 1 for example practically exclusively by the engagement of wedging rollers 50 with wedge surfaces 52. The lifting and lowering cams do nothing more than bring the lower dies up to face-to-face relation with the upper dies where the pressing can begin. The tilting (locking and unlocking) cams only effect closing of the dies from face-to-face relation to the pressing position and then releasing, at the beginning and end of the pressing zone; they are entirely inoperative during the remainder of the travel path.

According to the present invention the portion of the turret path in which the dies must be open for transfer purpose, is held down to a very small fraction of the total path.

For this purpose the loading mechanism and the unloading mechanism are spaced along the turret path so that they coact with portions of the path separated by about the distance between adjacent pairs of pressing dies.

According to a further modification of the present invention the loading on and unloading from the pressing dies is accomplished by simple chute arrangements similar to that shown for the unloading chute 340 in the construction of FIG. 11.

FIG. 12 schematically shows the essential elements of a chute type of loading device exemplifying the present invention. In this view two sets of upper pressing dies 532, 533 and lower pressing dies 542, 543 are shown in adjacent positions of pressing die travel of the continuous (non-intermittent) type, the horizontal travel direction being indicated by the arrow 511. The upper dies are relatively fixed against vertical movement. Each lower die, however, is connected for automatic vertical reciprocation from a high position in pressing engagement with the upper dies to a low position indicated by the die 542.

Around each lower die and horizontally movable therewith is shown a funnel type of loading chute 550. These chutes are fixed with respect to vertical movement and have their lower openings 560 positioned closely adjacent the upper edge of the lower dies when in their lowest or loading position.

At a predetermined portion of the horizontal travel path there is provided a fixed loading conveyor or slide 556 positioned to receive individual articles 554 and feed them in suitably timed relation into the successive chutes 550 as they pass by. An escapement mechanism such as the one shown in the construction of FIG. 11 can be connected for this purpose. In addition the loading conveyor is so located that the lower pressing dies are in their lower position when the articles are dropped into the loading chutes.

By reason of the tapered character of these chutes the articles 554 fall in a guided manner through the lower chute openings 560 so that they land, properly positioned, on the lower dies, notwithstanding some variation in the exact location of the continually moving chute with respect to the loading conveyor 556. A suitable time after the loading, the lower dies are moved up as indicated by the die 543, carrying the loaded article into pressing engagement with the upper dies. The engaged dies then move through a pressing zone and finally are again opened to unload the pressed articles for example from the upper dies by means of an unloading chute such as that shown in FIG. 11.

If desired the feed of conveyor 556 can be arranged to be vigorous enough to at least partially throw the articles across the hopper-like chute 550 so that they are brought into engagement with the far wall of this chute and settle down into place as indicated in FIG. 12. The use of vertical hopper walls where they are engaged by the articles being fed is of advantage in keeping the articles from coming to rest in tilted condition with one edge resting on the hopper, and the opposite edge in the die. However, the hopper walls that are on the sides that extend across the direction of die travel (arrow 511) are preferably sloped to accommodate variations in article feed.

It is noted that the usual guide ring around the margin of the lower die, by reason of its tapering guide walls, assists in guiding the falling article into its proper position.

Where the articles to be pressed are very light in weight and of generally dished shape, it is advantageous to have the lower dies of the female type as shown in FIG. 12, so that the articles 554 can be dropped with the convex face directed downwardly. This orientation provides somewhat more rapid dropping with less tendency to bounce against the sides of the chute, and more accurate alignment on the die. Furthermore, the articles after pressing are more readily and accurately blown off from the upper dies which usually are of the smooth type used to provide a high finish. However, the converse die positioning can be used if desired.

Although in the various constructions described in FIGS. 1 to 12 inclusive the pressing of generally circular articles is illustrated, non-circular articles can also be treated by merely suitably shaping the various dies. Thus square or rectangular dishes or trays, or the molded type of egg-containers or egg-crating flats are particularly well adapted for pressing in any of the above types of equipment.

FIG. 13 shows a further embodiment of simplified loading device. This view corresponds generally to that of FIG. 12 but shows an inclined conveyor or slide 656 down which dished articles 654 to be molded are supplied so that they move down to the low end. At this end a resilient restrainer such as a spring finger 657 keeps the articles from falling off but in a position that exposes a concave portion of the article in the path of a pressing die 642. This die is of generally convex shape corresponding to that of the article 654, and in moving along in direction 611 catches the projecting concave portion of article 654 at the restrained position, pushes back the restraining finger and carries along the article thereby loading itself. After loading, the dies can be closed in any desired manner.

The type of apparatus shown in FIG. 13 is particularly well suited for use with articles of rectangular or square outline since such articles can be easily and accurately guided into the restrained position shown. However, articles of circular or other non-rectangular outline can also be very effectively loaded with the apparatus. Where a conveyor is used instead of the slide shown at 656, the restraining finger 657 should be sufficiently strong to hold back articles impelled by the conveying action alone.

The apparatuses of FIGS. 12 and 13, although shown in connection with non-intermittent pressing die rotation, can also be very effectively used with a pressing die assembly that rotates in short steps as in the construction of FIG. 2.

Whereas twelve sets of dies are shown in the assemblies of the above figures, any number, more or less than twelve, can be used. As many as sixteen or even twenty-four make a very effective assembly having a productive capacity that is unusually high in relation to the cost of the apparatus. This also improves the productive efficiency of the apparatus because the greater number of pressing dies can be used with the same small transfer device which extends over the same few numbers of pressing positions. The loading assemblies of FIGS. 12 and 13 can be combined with unloading devices such as unloading chutes by placing one unloading device adjacent a loading assembly so that they are spaced by about the distance between adjacent pairs of pressing dies, to provide a pressing zone of maximum extent, as shown for example in the construction of FIGS. 1 and 2.

As many apparently widely different embodiments of the invention may be made without departing from the spirit and scope thereof, it is to be understood that the invention is not limited to the specific embodiments thereof except as limited by the appended claims. Thus the transfer device of the construction of FIG. 2 can be used to feed to and unload articles from other article handling devices such as printers, labellers, etc.

This application is a divisional application of application Serial No. 251,411 of October 15, 1951, now U.S. Patent No. 2,752,830 of July 3, 1956.

What is claimed is:

1. A transfer mechanism for supplying molded pulp articles one at a time to a handling device, said mechanism including a plurality of holders including means to receive and discharge articles therefrom and connected together in spaced relation in a plane to form a single unit, impelling elements associated with said unit to rotate the unit about an axis perpendicular to said plane to move the individual holders through a path including a loading zone, an unloading zone, a feed assembly at said loading zone for holding a nested group of articles to be supplied, an unloading receiver at the unloading position, and a transfer receiver at the transfer position, said impelling elements being also associated with said unit to intermittently stop the rotation of the holder unit with a holder positioned at each of the loading zones, the transfer zone and the unloading zone, and to reciprocate the unit in a direction that carries the holder positioned at the loading zone toward and away from the nested group to pick up the first article of the group and return to the rotation position.

2. A transfer mechanism for supplying molded pulp articles one at a time to a handling device, said mechanism including at least four holders including means to receive and discharge articles therefrom and connected together in spaced relation in a horizontal plane to form a single unit, impelling elements associated with said unit to rotate the unit in steps about a vertical axis to move the individual holders through a path including a loading position, an unloading position and a transfer zone extending over two other positions, a feed assembly at said loading position for holding a stack of articles to be supplied, an unloading receiver at the unloading position, one of said other positions being adapted to receive a transferred article for handling and the other being adapted to supply a handled article to said transfer mechanism and said impelling elements being also associated with said unit to reciprocate the unit vertically between rotation steps and carry a holder toward and away from the stack to pick up the topmost article of the stack and return to the rotation position.

3. The combination as defined by claim 2 in which the holders are shaped to receive dished articles with their convex surface up, the feed assembly includes a support for carrying a stack of correspondingly oriented molded articles to be handled, and constricting structure mounted for engaging the upper portion of the stack to upwardly bow the article immediately below the uppermost one in the stack and bring portions of its margin away from nested relation with the uppermost article for simplifying the loading from the feed to the transfer holder.

4. In a pressing apparatus for subjecting a molded pulp article to a finishing treatment, the combination of a series of mating pairs of pressing dies, the series being disposed in the form of an endless loop of compactly spaced pairs, driving structure connected to the dies for rotating the series around the loop, operating mechanism connected to move one of the dies of each pair away from the other in a fixed transfer zone of the travel path, the other die of each pair being substantially non-retractably mounted, said operating mechanism comprising a transfer device including loading means for delivering an article to be pressed to one of the dies of each pair while these dies are held apart, said loading means comprising a loading device having a fixed positioning holder with a resilient restrainer mounted to successively hold dished articles in the path of one of each pair of pressing dies, said last mentioned dies each having a convex portion adapted to engage the concave portion of a dished article, said operating mechanism being connected to return the open dies to face-to-face relation in the transfer zone after the article to be pressed is delivered, pressing means connected to press the dies of each pair together in face-to-face relation as they leave the transfer zone and to hold them together for the remainder of the travel path, said transfer device also including unloading means for receiving a pressed article from the open dies in the transfer zone to remove the pressed article from the apparatus and make way for a fresh article, said operating mechanism being connected to continuously move the dies in the uninterrupted manner, and the transfer elements being connected to load and remove articles while the dies are rotating.

5. A feeding device for supplying molded pulp articles to a handling assembly from an elongated stack of such articles, said device including a support for the stack, separating elements on one side of the support for cooperation with the article at one end of the stack, operating mechanism connected to reciprocate the stack longitudinally and bring said end of the stack toward and away from the separating elements, said operating mechanism being also connected for coaction with the separating elements in synchronism with the reciprocation to remove the article at said end of the stack while the stack is brought close to the separating elements, for causing the return of the stack to compensate for the normal resiliency of stacks of molded pulp articles, and remove all but the separated article from the separating elements.

6. A feeding device for supplying molded pulp articles to a handling assembly from an elongated stack of such articles, said device including a platform for vertically supporting such a stack, separating elements above the platform for cooperation with the article at the top of the stack, operating mechanism connected to reciprocate the platform up and down and bring the top of the stack toward and away from the separating elements, said operating mechanism being also connected to coact with the separating elements in synchronism with the reciprocation to remove the topmost article of the stack while the stack is brought to substantially its highest position for causing the return of the stack to compensate for the normal resiliency of stacks of molded pulp articles and remove all but the separated article from the separating elements, and said separating mechanism being further connected to cause each lifting operation to bring the top of the stack into engagement with the separating elements regardless of the number of articles in the stack and regardless of the position of the platform.

7. The combination of claim 6 in which the separating elements include a restricting structure narrower than the articles of the stack to cause the article below the one at the top of the stack to be squeezed and held down so that the topmost article is freely removable.

8. The combination of claim 6 in which the separating elements include a transfer die connected to engage the topmost article of the stack and lift it away from the stack.

9. The combination of claim 6 in which the operating mechanism is connected to continually urge the platform upwardly up to the separating elements, and also includes escapement mechanism connected to alternately pull the platform down and then release it.

10. In a molded pulp pressing apparatus including a series of mating pairs of pressing dies which move in a predetermined path, one die in each pair being movable from an open to a closed position with respect to its mate, an unpressed article feeding device and a pressed article unloading device rotatable about the same axis of rotation and positioned adjacent one portion of said predetermined path, and means to move said devices to positions between successive mating pairs of said dies while they are open and to feed an unpressed article to one of said open pairs of dies while simultaneously removing a pressed article from said other open pair of dies.

11. The apparatus as defined in claim 10 including means for supplying an unpressed article to said unpressed article feeding device.

12. The apparatus as defined in claim 10 including means for discharging a pressed article from said pressed article unloading device.

13. In a molded pulp pressing apparatus including a series of mating pairs of pressing dies which move intermittently along a predetermined path with interspersed periods of rest, one die in each pair being movable from an open to a closed position with respect to its mate, an unpressed article feeding device and a pressed article unloading device rotatable about the same axis of rotation and positioned adjacent one portion of said predetermined path, and means to intermittently move said devices to positions between successive mating pairs of said dies while they are open and during a period of rest and to feed an unpressed article to one of said open pairs of dies while simultaneously removing a pressed article from said other open pair of dies.

14. In a molded pulp pressing apparatus including a series of mating pairs of pressing dies which move in a predetermined path, one die in each pair being movable from an open to a closed position with respect to its mate, at least four article transfer devices rotatable about the same axis of rotation and positioned adjacent one portion of said predetermined path, means for supplying an unpressed article to one of said transfer devices, means for receiving a pressed article from one of said transfer devices, and means to move two of said transfer devices to positions between successive mating pairs of said dies while they are open and to feed an unpressed article to one of said open pairs of dies while simultaneously removing a pressed article from said other open pair of dies.

15. The apparatus as defined in claim 14 in which the mating pairs of dies are shaped to receive dished articles with their convex surfaces up, said means for supplying an unpressed article including a support for carrying a stack of correspondingly oriented unpressed molded articles and constricting structure mounted to engage the next to the uppermost article of the stack and bring portions of its margin away from nested relation with the uppermost article.

16. Apparatus for pressing molded pulp articles, said apparatus comprising a series of mating pairs of pressing dies which move in a predetermined path, one die in each pair being movable from an open to a closed position with respect to its mate, driving structure associated with said dies to simultaneously stepwise move the series of mating pairs of pressing dies along said predetermined path including a short transfer zone and a longer pressing zone, a unitary transfer mechanism rotatable about a single axis of rotation and associated with said dies to part the dies as they step into the transfer zone, one portion of said mechanism being adapted to obtain an unpressed article for a subsequent loading step, another portion being adapted to load an unpressed article into a pair of open dies in said transfer zone while simultaneously unloading a pressed article from the next adjacent open pair of dies in said transfer zone, and another portion of said transfer mechanism being adapted to discharge a pressed article obtained from a previous unloading step, and means connected to close the pairs of dies as they step into the pressing zone and keep them closed throughout said pressing zone.

References Cited in the file of this patent

UNITED STATES PATENTS

| | | |
|---|---|---|
| 759,616 | Keyes | May 10, 1904 |
| 1,574,564 | Farnsworth | Feb. 23, 1926 |
| 1,647,379 | Swift | Nov. 1, 1927 |
| 1,738,097 | Cooper | Dec. 3, 1929 |
| 2,166,268 | Simmons | July 18, 1939 |
| 2,247,787 | Schmidt | July 1, 1941 |
| 2,253,283 | Minaker | Aug. 19, 1941 |
| 2,294,273 | Buxbaum | Aug. 25, 1942 |
| 2,337,581 | Wiley | Dec. 28, 1943 |
| 2,359,432 | McNamara | Oct. 3, 1944 |
| 2,384,052 | Stewart et al. | Sept. 4, 1945 |
| 2,388,828 | Chaplin | Nov. 13, 1945 |
| 2,549,396 | Wahl | Mar. 13, 1951 |
| 2,632,936 | Skipper | Mar. 31, 1953 |
| 2,640,402 | Comstock | June 2, 1953 |
| 2,647,673 | Galik | Aug. 4, 1953 |
| 2,652,931 | Hughes | Sept. 22, 1953 |
| 2,653,743 | Stenger | Sept. 29, 1953 |